US008484620B2

(12) United States Patent
Bates et al.

(10) Patent No.: US 8,484,620 B2
(45) Date of Patent: Jul. 9, 2013

(54) IMPLEMENTING PERFORMANCE IMPACT REDUCTION OF WATCHED VARIABLES

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1971 days.

(21) Appl. No.: 11/279,444

(22) Filed: Apr. 12, 2006

(65) Prior Publication Data
US 2007/0245316 A1 Oct. 18, 2007

(51) Int. Cl.
G06F 9/44 (2006.01)
G06F 9/45 (2006.01)

(52) U.S. Cl.
USPC ........... 717/127; 717/124; 717/128; 717/129; 717/130; 717/143

(58) Field of Classification Search
None
See application file for complete search history.

(56) References Cited

U.S. PATENT DOCUMENTS

| | | | | |
|---|---|---|---|---|
| 5,446,900 A * | 8/1995 | Kimelman | ..................... | 717/124 |
| 5,784,552 A * | 7/1998 | Bishop et al. | ................... | 714/38 |
| 6,023,583 A * | 2/2000 | Honda | .......................... | 717/158 |
| 6,085,029 A * | 7/2000 | Kolawa et al. | .................. | 714/38 |
| 6,295,613 B1 * | 9/2001 | Bates et al. | ....................... | 714/43 |
| 6,795,963 B1 * | 9/2004 | Andersen et al. | ............. | 717/130 |
| 2003/0061542 A1 * | 3/2003 | Bates et al. | ..................... | 714/38 |
| 2004/0199904 A1 * | 10/2004 | Schmidt | ......................... | 717/130 |
| 2004/0255278 A1 * | 12/2004 | Bates et al. | .................... | 717/129 |
| 2005/0027953 A1 * | 2/2005 | McIntosh et al. | ............. | 711/158 |
| 2007/0079177 A1 * | 4/2007 | Spirakis et al. | ................. | 714/34 |

OTHER PUBLICATIONS

Watterson et al. Goal-Directed Value Profiling. [online] (2001). Springer-Verlag Berlin Heidelberg., pp. 1-15. Retrieved From the Internet <http://citeseerx.ist.psu.edu/viewdoc/download?doi=10.1.1.31.6614&rep=rep1&type=pdf>.*

* cited by examiner

Primary Examiner — Emerson Puente
Assistant Examiner — Jonathan R Labud
(74) Attorney, Agent, or Firm — Joan Pennington

(57) ABSTRACT

A method, apparatus and computer program product are provided for implementing performance impact reduction of watched variables. Source code is parsed and a variable in the source code to be watched is identified. The identified variable is allocated to a predefined page of storage. The predefined page of storage is separated from frequently accessed variables, such as, a page containing least frequently modified variables, a last page associated with a static storage, and a separate page added for receiving the identified variables to be watched.

13 Claims, 5 Drawing Sheets

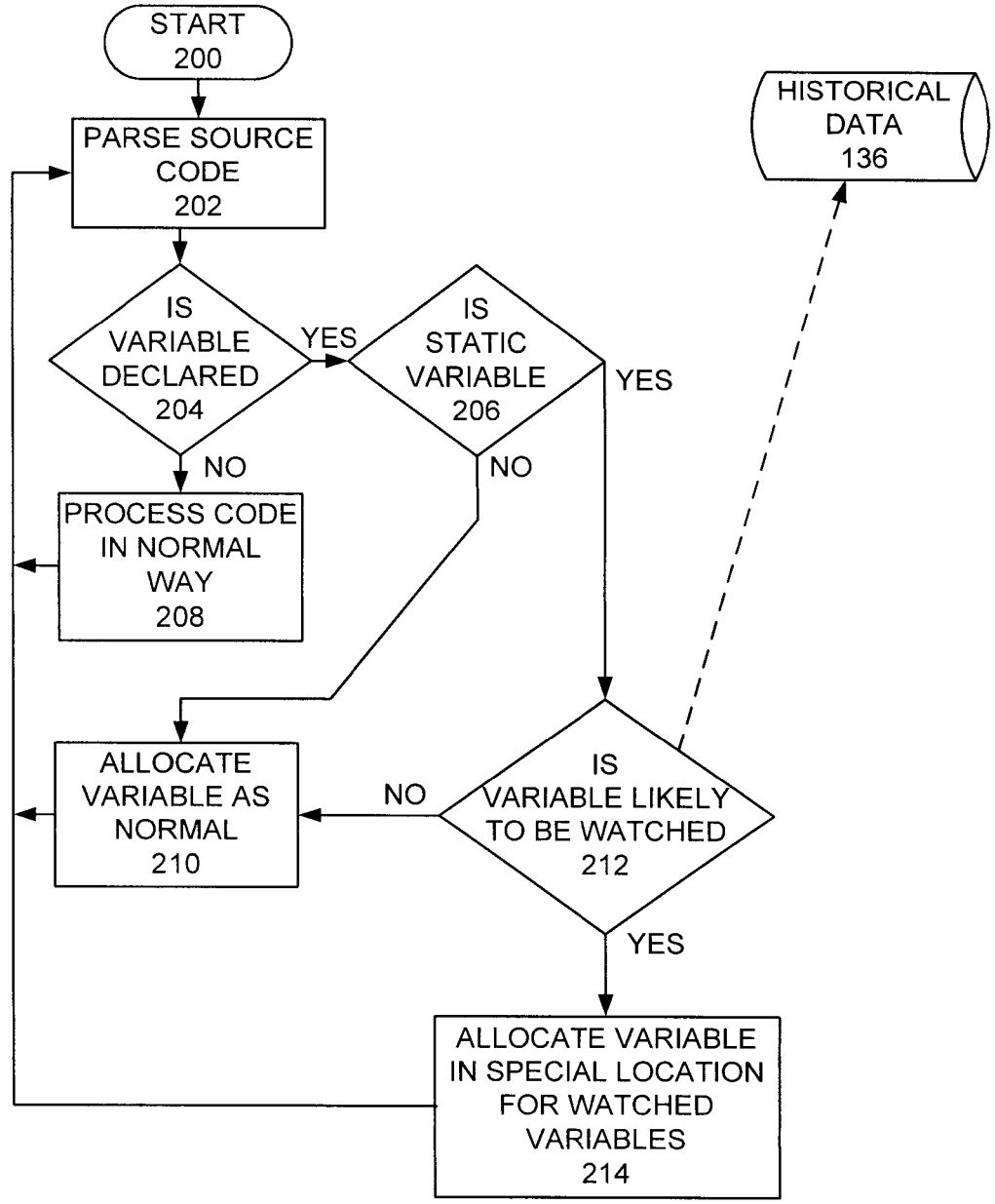

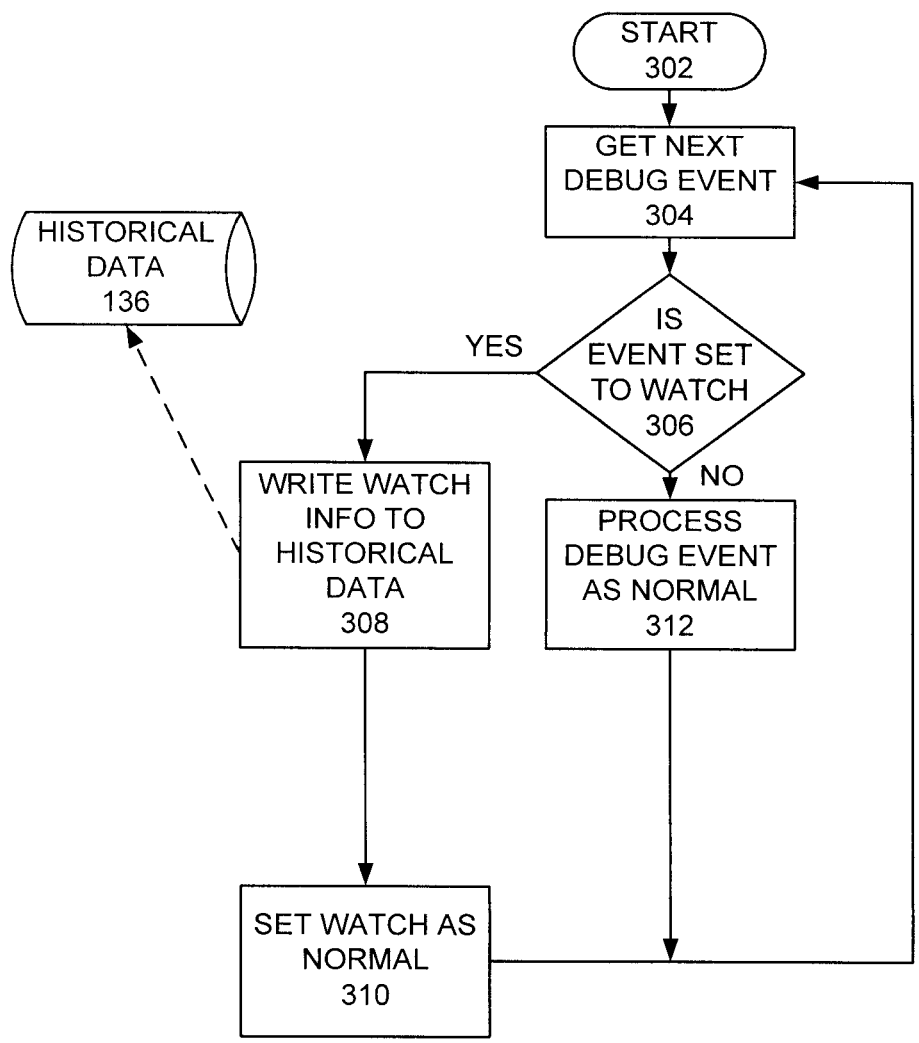

US 8,484,620 B2

IMPLEMENTING PERFORMANCE IMPACT REDUCTION OF WATCHED VARIABLES

FIELD OF THE INVENTION

The present invention relates generally to the data processing field, and more particularly, relates to a method, apparatus and computer program product for implementing performance impact reduction of watched variables.

DESCRIPTION OF THE RELATED ART

One of the problems that occurs when watching variables within a debugger is that sometimes setting the watch can cause performance impacts that effect program timing to the point that the desired problem does not occur.

Today watches are implemented by setting the write only bit on a page such that when the user attempts to write to that page of storage a trap occurs. A trap handler then takes control, resets the bit, and retries the write. The trap handler then resets the bit to write protect the page again and tests to see if the memory modified was being watched.

If the memory was not being watched the trap handler returns and allows the program to continue running, but if the storage that was modified was being watched, the trap handler transfers control to the debugger, and the debug stop occurs at the position in the executable code where the write was performed. When variables on the same page as the watched variable are frequently "stored to", there can be a significant number of CPU cycles spent handling these false watch traps.

The main issue that exacerbates the problem is that compilers today purposely group variables together to obtain better access times, so the frequently accessed variables are more likely to be stored close to each other in storage. This provides for better cache coherence with fewer cache misses.

However, in the debug environment this allocation can cause more watch traps to occur when watching variables, adding more overhead to the program and corrupting program timing. In many cases the timing is affected so much, that a timing problem being debugged no longer occurs.

Additionally some memory overwrite problems occur on a very sporadic basis. In fact, some customers have been known to leave their server job up and running for days (even in production mode) while they service it. During this time they have a debug session with an active watch set on some storage that they expect to be corrupted at some point. In situations like this program performance can be a significant issue.

A need exists for a mechanism for implementing performance impact reduction of watched variables.

SUMMARY OF THE INVENTION

Principal aspects of the present invention are to provide a method, apparatus and computer program product for implementing performance impact reduction of watched variables. Other important aspects of the present invention are to provide such method, apparatus and computer program product for implementing performance impact reduction of watched variables substantially without negative effect and that overcome many of the disadvantages of prior art arrangements.

In brief, a method, apparatus and computer program product are provided for implementing performance impact reduction of watched variables. Source code is parsed and a variable in the source code to be watched is identified. The identified variable is allocated to a predefined page of storage. The predefined page of storage is separated from frequently accessed variables.

In accordance with features of the invention, when a debugging option is specified on the compile, these variables are purposely allocated into pages of storage, which are separate from the variables that are accessed around the watched variables. Moving the watched variables to a page where there will be less false traps greatly improves program performance and system throughput. Variables are identified as variables, which are likely to be watched in a performance critical environment, for example, by the user simply selecting the variables to be allocated to be watched without causing a large amount of false traps. Also the debugger can track the usage of the watch function and track the variables that have been or are frequently watched.

In accordance with features of the invention, the compiler provides a performance debug option, which includes full debug capability along with other debug performance options. When this option is specified the compiler interrogates a debug historical data file, and determines which variables are to be watched.

In accordance with features of the invention, the compiler allocates these variables that are identified to be watched in static storage so that they appear on a page separated from other frequently accessed variables. For example, the compiler allocates these identified variables to a page that contains the coldest variables, or least frequently modified variables. The compiler can allocate the identified variables to be watched to a last page associated with static storage. The compiler can allocate the identified variables to a separate page added for receiving the identified variables to be watched.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2 and 3 are flow chart illustrating exemplary steps for implementing performance impact reduction of watched variables in accordance with the preferred embodiment;

DETAILED DESCRIPTION OF THE PREFERRED EMBODIMENTS

In accordance with features of the invention, a method is provided by which variables that are likely to be watched are identified, and when a debugging option is specified on the compile, these variables are purposely allocated into pages of storage which are separate from the variables that are accessed around them. Moving the watched variables or watched record to a page where there will be less false traps greatly improves program performance and system throughput.

Figure 1A:
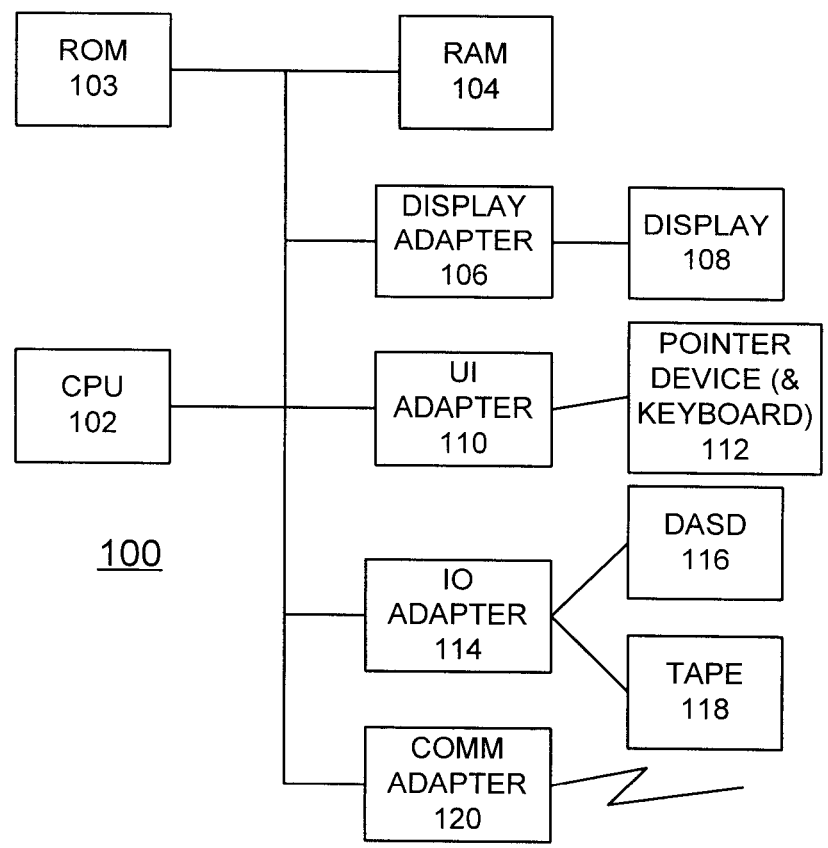
FIGS. 1A and 1B are block diagram representations illustrating a computer system and operating system for implementing performance impact reduction of watched variables in accordance with the preferred embodiment.
Figure 1B:
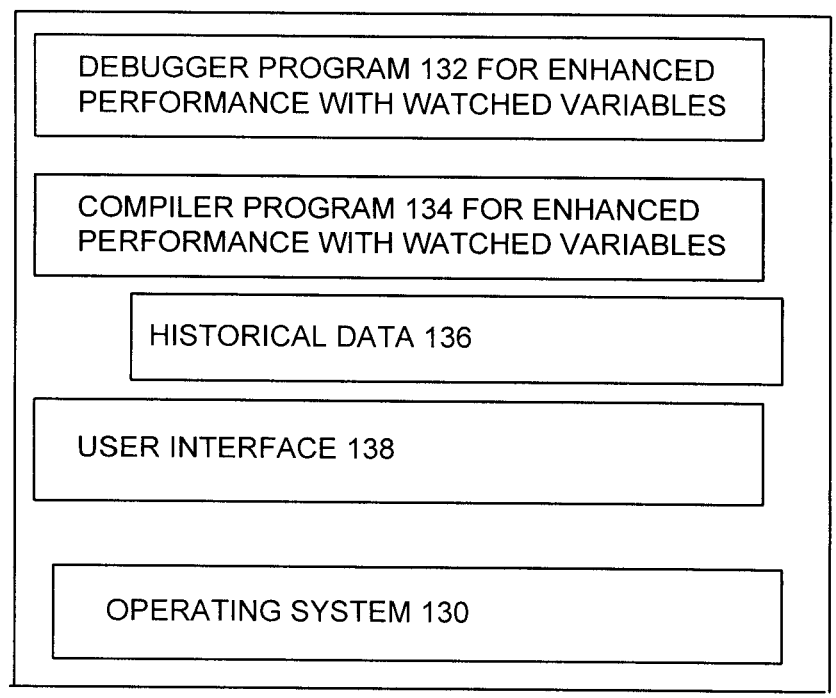

Referring now to the drawings, in FIGS. 1A and 1B there is shown a computer system generally designated by the reference character 100 for implementing watched variables with adverse performance impact reduction in accordance with the preferred embodiment. Computer system 100 includes a main processor 102 or central processor unit (CPU) 102 coupled by a system bus to a read only memory (ROM) 103 and a random access memory (RAM) 104. Computer system 100 includes a display interface 106 connected to a display 108, and a user interface (UI) adapter 110 connected to a user entry pointer device and keyboard 112. Computer system 100 includes an I/O adapter 114 that connects a direct access storage device (DASD) 116 and a tape 118 to the main processor 102.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

As shown in FIG. 1B, computer system 100 includes an operating system 130, and a debugger program 132 and a compiler program 134, each for implementing performance impact reduction of watched variables of the preferred embodiment, for example, using historical data 136 of the preferred embodiment; and a user interface 138 of the preferred embodiment.

Various commercially available computers can be used for computer system 100; for example, an iSeries computer system manufactured and sold by International Business Machines Corporation and processor 102 can be implemented, for example, by one of a line of PowerPC processors manufactured and sold by International Business Machines Corporation. Central processor unit 102 is suitably programmed to execute the flowchart of FIGS. 2 and 3 for implementing performance impact reduction of watched variables of the preferred embodiment.

In accordance with features of the preferred embodiment, a method of the invention allows several ways that variables can be identified as variables, which are likely to be watched in a performance critical environment. A first way is that the user, with the user interface 138 and compiler program 134, simply selects the variables to be allocated in such a way that they can be watched without causing a large amount of false traps. It is also possible for the debugger 132 to track the usage of the watch function and track the variables have been or are frequently watched.

In accordance with features of the preferred embodiment, the compiler provides a performance debug option, which includes full debug capability along with other debug performance options. When this option is specified the compiler interrogates a debug historical data file, and determines which variables are likely to be watched. The compiler allocates these variables that are identified in static storage so that they appear on a page away from other frequently accessed variables.

In accordance with features of the invention, an advanced embodiment determines which of the variables are most often "stored to" using dynamic methods such as profiling or static analysis methods like using loop nesting depth of a particular assignment as an estimate how many times the assignment may executed. For the purposes of a watch function, which looks for writes, we are only concerned with how often the program writes to storage. To implement this invention the compiler program 134 simply moves these watched variables to pages that contain infrequently modified variables.

Many optimizers look at accesses to variables like this today and try to arrange the variables in storage so the "hot" ones are together and thus likely to be in the same cache line for improved performance. Compilers look at both reads and writes when trying to group variables for cache hits, using this information can still be used to reduce false traps. The compiler program 134 of the invention simply takes advantage of this information to move the watched variable or variables to a page that contains the coldest variables, or least frequently modified variables.

In accordance with features of the preferred embodiment, alternately some embodiments of compiler program 134 may choose to add a separate page or pages for the variables to be watched. This way the false traps will be kept to an absolute minimum because only writing to a variable that is likely to be watched will cause a trap to occur.

In accordance with features of the preferred embodiment, a simple method that may be used to implement the invention is to move all these variables, which the user has specified to be watched to the last page associated with the static storage. By moving these variables to the last page, there is likely less false traps because the last page is not likely to be fully allocated.

Referring now to FIG. 2, there are shown exemplary steps performed by compiler program 134 for implementing performance impact reduction or enhanced performance with watched variables in accordance with the preferred embodiment starting at a block 200. First source code is parsed as indicated in a block 202. Checking for a declared variable is performed as indicated in a decision block 204.

When a declared variable is identified, checking whether the variable is a static variable is performed as indicated in a decision block 206. When a declared variable is not identified, then the source code is processed in the normal way as indicated in a block 208. When determined not a static variable at decision block 206, then the variable is allocated as normal as indicated in a block 210.

When a static variable is identified at decision block 206, then checking whether the variable is likely to be watched as indicated in a decision block 212, for example by accessing debug historical data 136 of the preferred embodiment. When the variable is likely to be watched, then the variable is allocated to a special location for watched variables as indicated in a block 214. For example, the variable likely to be watched is allocated to a page that contains the coldest variables, or least frequently modified variables. For example, the variable likely to be watched is allocated to static storage so that they appear on a page away from other frequently accessed variables, or to the last page associated with the static storage where there are likely less false traps because the last page is not likely to be fully allocated.

Referring now to FIG. 3, there are shown exemplary steps performed by debugger program 132 for implementing performance impact reduction or enhanced performance with watched variables in accordance with the preferred embodiment starting at a block 302. As indicated in a block 304, a next debug event is identified. Checking whether the event is set to watch is performed as indicated in a decision block 306. When the event is set to watch, then as indicated in a block 308 the watch information is written to historical data file 136 of the preferred embodiment. Then the watch is set as normal as indicated in a block 310. Otherwise when the event is not set to watch, then the debug event is processed as normal as indicated in a block 312. Operations continue with a next debug event at block 304.

Figure 4:
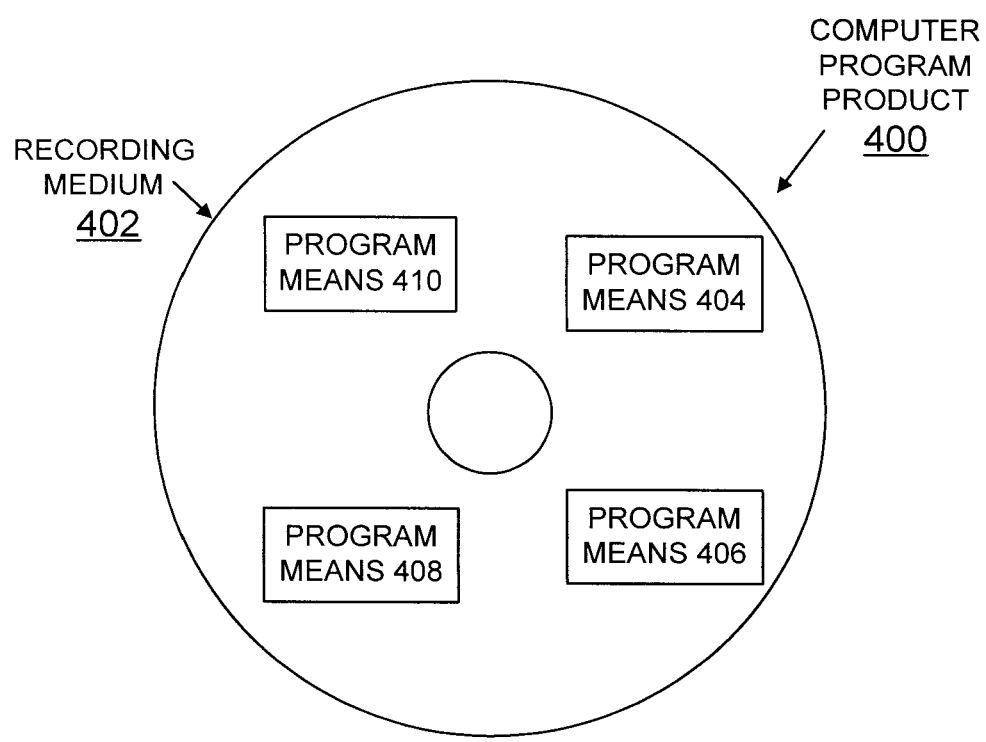
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, or a similar computer program product. Recording medium 402 stores program means 404, 406, 408, 410 on the medium 402 for carrying out the methods for implementing performance impact reduction of watched variables of the preferred embodiment in the system 100 of FIGS. 1A and 1B.

A sequence of program instructions or a logical assembly of one or more interrelated modules defined by the recorded program means 404, 406, 408, 410, direct the computer system 100 for implementing performance impact reduction of watched variables of the preferred embodiment.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

While the present invention has been described with reference to the details of the embodiments of the invention shown in the drawing, these details are not intended to limit the scope of the invention as claimed in the appended claims.

What is claimed is:

1. A computer-implemented method for implementing performance impact reduction of user specified watched variables comprising the steps of:
   parsing source code;
   identifying a variable in said source code to be watched; and
   allocating said identified variable into a predefined page of storage, said predefined page of storage being separated away from a storage page for frequently accessed variables for minimizing false watch traps for the frequently accessed variables; and said predefined page of storage being a selected one of a page containing least frequently modified variables, a last page associated with a static storage and a page added for receiving the identified variables to be watched.

2. A computer-implemented method as recited in claim 1 wherein the step of identifying a variable in said source code to be watched includes interrogating a historical data file.

3. A computer-implemented method as recited in claim 2 includes providing a debugger program for tracking a watch event and for tracking said variable to be watched; and for writing to said historical data file.

4. A computer-implemented method as recited in claim 1 wherein the step of identifying a variable in said source code to be watched includes identifying a user specified variable.

5. A method for deploying computing infrastructure, comprising integrating computer readable code into a computing system, wherein the code in combination with the computing system is capable of performing the method of claim 1.

6. Apparatus for implementing performance impact reduction of user specified watched variables in a compiler system comprising:
   a processor;
   a compiler program tangibly embodied in a computer recording medium used for parsing source code; said compiler program including instructions executed by said processor;
   said processor responsive to said compiler program for identifying a variable in said source code to be watched; and
   said processor responsive to said compiler program for allocating said identified variable into a predefined page of storage, said predefined page of storage being separated away from a storage page for frequently accessed variables for minimizing false watch traps for the frequently accessed variables; and said predefined page of storage being a selected one of a page containing least frequently modified variables, a last page associated with a static storage and a page added for receiving the identified variables to be watched.

7. The apparatus as recited in claim 6 further includes a debugger program for tracking a watch event and for tracking said variable to be watched, and for writing to a historical data file.

8. The apparatus as recited in claim 7 wherein said compiler program uses a selected one of a user specified variable and said historical data file for identifying said variable in said source code to be watched.

9. A compiler computer program product tangibly embodied in a computer recording medium for implementing performance impact reduction of user specified watched variables in a computer system, said computer recording medium including a selected one or combination of a floppy disk, a high capacity read only memory in the form of an optically read compact disk or CD-ROM, and a tape, said compiler computer program product including instructions executed by the computer system to cause the computer system to perform the steps comprising:
   parsing source code;
   identifying a variable in said source code to be watched; and
   allocating said identified variable into a predefined page of storage, said predefined page of storage being separated away from a storage page for frequently accessed variables for minimizing false watch traps for the frequently accessed variables; and said predefined page of storage being a selected one of a page containing least frequently modified variables, a last page associated with a static storage and a page added for receiving the identified variables to be watched.

10. A computer program product as recited in claim 9 further comprises providing a debugger program for tracking a watch event and for tracking said variable to be watched; and for writing to a historical data file.

11. A computer program product as recited in claim 10 further comprising using a selected one of a user specified variable and said historical data file for identifying said variable in said source code to be watched.

12. A computer program product as recited in claim 9 wherein the step of identifying a variable in said source code to be watched includes interrogating a historical data file.

13. A computer program product as recited in claim 9 wherein the step of identifying a variable in said source code to be watched includes identifying a user specified variable.

* * * * *